US012633656B2

(12) United States Patent
Cui et al.

(10) Patent No.: US 12,633,656 B2
(45) Date of Patent: May 19, 2026

(54) PHASE SHIFTER, MANUFACTURING METHOD THEREOF, AND ANTENNA

(71) Applicant: BOE TECHNOLOGY GROUP CO., LTD., Beijing (CN)

(72) Inventors: Zhao Cui, Beijing (CN); Zhonglan Zhao, Beijing (CN); Feng Zhang, Beijing (CN); Wengu Liu, Beijing (CN); Zhijun Lv, Beijing (CN); Liwen Dong, Beijing (CN); Detian Meng, Beijing (CN); Dongfei Hou, Beijing (CN); Yuqiao Li, Beijing (CN); Mengya Song, Beijing (CN); Guoteng Li, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 214 days.

(21) Appl. No.: 18/291,907

(22) PCT Filed: Feb. 24, 2023

(86) PCT No.: PCT/CN2023/078125
§ 371 (c)(1),
(2) Date: Jan. 24, 2024

(87) PCT Pub. No.: WO2024/174224
PCT Pub. Date: Aug. 29, 2024

(65) Prior Publication Data

US 2025/0087879 A1 Mar. 13, 2025

(51) Int. Cl.
*H01Q 3/30* (2006.01)
*H01P 1/18* (2006.01)
(Continued)

(52) U.S. Cl.
CPC ................ *H01Q 3/30* (2013.01); *H01P 1/18* (2013.01); *H01Q 1/422* (2013.01); *H01Q 3/34* (2013.01); *H01Q 3/36* (2013.01); *H01Q 3/38* (2013.01)

(58) Field of Classification Search
CPC ........... H01Q 3/30; H01Q 1/422; H01Q 1/02; H01Q 3/44; H01Q 3/36; H01Q 21/065;
(Continued)

(56) References Cited

U.S. PATENT DOCUMENTS

| | | | | |
|---|---|---|---|---|
| 11,133,580 | B2 * | 9/2021 | Li | H01Q 1/36 |
| 2015/0380789 | A1 * | 12/2015 | Jakoby | H01P 1/184 343/905 |

(Continued)

FOREIGN PATENT DOCUMENTS

| | | | |
|---|---|---|---|
| CN | 105308789 | A | 2/2016 |
| CN | 108803096 | A | 11/2018 |

(Continued)

*Primary Examiner* — John W Poos
(74) *Attorney, Agent, or Firm* — Nath, Goldberg & Meyer; Joshua B. Goldberg

(57) ABSTRACT

A phase shifter includes first and second dielectric substrates opposite to each other and a plurality of phase shift units between the first and the second dielectric substrates; the phase shift unit includes first and second electrode layers and an adjustable dielectric layer between the first and the second electrode layers; orthographic projections of the first and second electrode layers on the first dielectric substrate at least partially overlap each other, and at least one accommodation cell of the phase shift unit is defined in a region where the orthographic projections of the first and second electrode layers on the first dielectric substrate overlap each other; the adjustable dielectric layer is in at least the accom-
(Continued)

modation cell; and cell gaps of the accommodation cells of at least a part of the plurality of phase shift units are different from each other.

19 Claims, 8 Drawing Sheets

(51) Int. Cl.
*H01Q 1/42* (2006.01)
*H01Q 3/34* (2006.01)
*H01Q 3/36* (2006.01)
*H01Q 3/38* (2006.01)

(58) Field of Classification Search
CPC .. H01Q 1/38; H01Q 1/50; H01Q 3/34; H01Q 3/26; H01Q 1/48; H01Q 21/0087; H01Q 9/0414; H01Q 1/00; H01Q 1/002; H01Q 1/2291; H01Q 21/0025; H01Q 21/062; H01Q 21/067; H01Q 21/08; H01Q 23/00; H01Q 25/00; H01Q 3/2605; H01Q 9/0442; H01Q 9/0457; H01Q 1/36; H01Q 3/38; H01Q 1/22; H01Q 21/00; H01Q 21/0012; H01Q 15/0013; H01Q 15/0066; H01Q 15/14; H01Q 15/148; H01Q 21/0075; H01Q 21/06; H01Q 21/061; H01Q 21/22; H01Q 13/06; H01Q 21/064; H01Q 1/526; H01Q 19/10; H01Q 5/307; H01Q 9/045; H01Q 1/52; H01Q 13/02; H01Q 13/0283; H01Q 13/10; H01Q 21/0006; H01Q 21/24; H01Q 21/29; H01Q 3/04; H01Q 5/50; H01Q 9/0471; H01P 1/18; H01P 1/184; H01P 1/181; H01P 1/182; H01P 11/00; H01P 3/081; H01P 3/12; H01P 1/172; H01P 1/30; H01P 11/001; H01P 1/20345; H01P 1/38; H01P 1/20372; G02F 1/1343
See application file for complete search history.

(56) References Cited

U.S. PATENT DOCUMENTS

| | | | | |
|---|---|---|---|---|
| 2020/0266511 | A1* | 8/2020 | Kong | H01P 1/18 |
| 2020/0343634 | A1 | 10/2020 | Wang et al. | |
| 2021/0135327 | A1 | 5/2021 | Wang et al. | |
| 2021/0408680 | A1* | 12/2021 | Xi | H01P 1/184 |
| 2022/0006166 | A1* | 1/2022 | Li | H01Q 3/36 |

FOREIGN PATENT DOCUMENTS

| | | | |
|---|---|---|---|
| CN | 108808181 | A | 11/2018 |
| CN | 208818972 | U | 5/2019 |
| CN | 110048233 | A | 7/2019 |
| CN | 110085985 | A | 8/2019 |
| CN | 110707397 | A | 1/2020 |
| CN | 110943299 | A | 3/2020 |
| CN | 113871818 | A | 12/2021 |
| CN | 113972453 | A | 1/2022 |
| CN | 114253015 | A | 3/2022 |
| CN | 113871819 | B | 5/2022 |
| CN | 113871818 | B | 7/2022 |
| JP | 2021101511 | A | 7/2021 |

* cited by examiner

PHASE SHIFTER, MANUFACTURING METHOD THEREOF, AND ANTENNA

This is a National Phase Application filed under 35 U.S.C. 371 as a national stage of PCT/CN2023/078125, filed Feb. 24, 2023, the content of which is hereby incorporated by reference in its entirety.

TECHNICAL FIELD

The present disclosure relates to the field of communication technology, and particularly to a phase shifter, a manufacturing method thereof, and an antenna.

BACKGROUND

Liquid crystal is a condensed state of matter between solid and liquid states, and the liquid crystal generally includes three types, i.e. smectic liquid crystal, nematic liquid crystal, and cholesteric liquid crystal, arrangement manner of which is shown in FIG. 1. The nematic liquid crystal has such a structure that intermolecular force is low, viscosity is weak, and molecular orientation is prone to change under an action of an external electric field or magnetic field. The dielectric anisotropy of a liquid crystal material and the free-spinning nature of the molecules of the liquid crystal material allow that a material in this state may change its dielectric constant and hence change a phase constant when subjected to an external stimulus (electric or magnetic field).

The liquid crystal phase shifter changes the dielectric constant of the liquid crystal material, through applying a voltage to upper and lower substrates to form an overlapping capacitor between the upper and lower substrates, so that a phase constant of electromagnetic waves on the liquid crystal phase shifter is changed, and finally an effect of adjusting phase shift amount is achieved. A degree of phase shift of a liquid crystal phase shifter refers to a phase difference between an input port and an output port.

SUMMARY

The present disclosure is directed to at least one of the problems in the related art, and provides a phase shifter, a manufacturing method thereof, and an antenna.

In a first aspect, an embodiment of the present disclosure provides a phase shifter, including a first dielectric substrate and a second dielectric substrate opposite to each other, and a plurality of phase shift units between the first dielectric substrate and the second dielectric substrate, where each of the plurality of phase shift units includes a first electrode layer, a second electrode layer and an adjustable dielectric layer between the first electrode layer and the second electrode layer; the first electrode layer is on a side of the first dielectric substrate close to the adjustable dielectric layer, and the second electrode layer is on a side of the second dielectric substrate close to the adjustable dielectric layer; orthographic projections of the first electrode layer and the second electrode layer on the first dielectric substrate at least partially overlap each other, and at least one accommodation cell of the phase shift unit is defined in a region where the orthographic projections of the first electrode layer and the second electrode layer on the first dielectric substrate overlap each other; the adjustable dielectric layer is in at least the accommodation cell; and cell gaps of the accommodation cells of at least a part of the plurality of phase shift units are different from each other.

The first electrode layer includes a first signal electrode and a second signal electrode arranged side by side, the second electrode layer includes a plurality of patch electrodes arranged side by side along an extending direction of the first signal electrode and spaced apart from each other, and an orthographic projection of each of the first signal electrode and the second signal electrode on the first dielectric substrate overlaps an orthographic projection of each of the plurality of patch electrodes on the first dielectric substrate.

For each of the plurality of phase shift units, thicknesses of the first signal electrode and the second signal electrode are the same as each other; thicknesses of the first signal electrodes in at least a part of the plurality of phase shift units are different from each other; and thicknesses of the patch electrodes in the respective phase shift units are the same as each other.

Thicknesses of the patch electrodes in the respective phase shift units are the same as each other; for each of the plurality of phase shift units, thicknesses of the first signal electrode and the second signal electrode are different from each other.

thicknesses of the first signal electrodes in the respective phase shift units are different from each other, and/or thickness of the second signal electrode in the respective phase shift units are different from each other.

Thicknesses of the first electrode layers in the respective phase shift units are the same as each other, and thicknesses of the second electrode layers in at least a part of the plurality of phase shift units are different from each other.

The phase shifter further includes a plurality of spacers between the first dielectric substrate and the second dielectric substrate, where each of the plurality of spacers is between any two adjacent ones of the plurality of phase shift units.

The phase shifter further includes a plurality of spacers between the first dielectric substrate and the second dielectric substrate; where an orthographic projection of each of the plurality of spacers on the first dielectric substrate does not overlap an orthographic projection of the second electrode layer on the first dielectric substrate, and orthographic projections of at least a part of the plurality of spacers on the first dielectric substrate each overlap an orthographic projection of the first electrode layer on the first dielectric substrate.

For each of the plurality of phase shift units, the at least one accommodation cell includes a plurality of accommodation cells, and a first filling structure between any two adjacent ones of the plurality of accommodation cells is filled between the first dielectric substrate and the second dielectric substrate.

A material of the first filling structure includes an organic resin material.

The phase shift unit further includes a second filling structure between the first dielectric substrate and the second dielectric substrate, and filled between any two adjacent ones of the plurality of phase shift units.

A material of the second filling structure includes an organic resin material.

The first dielectric substrate has a plurality of first heat dissipation holes each penetrating through the first dielectric substrate in a thickness direction of the first dielectric substrate, and/or the second dielectric substrate has a plurality of second heat dissipation holes penetrating through the second dielectric substrate in a thickness direction of the second dielectric substrate.

the first dielectric substrate is provided with the pluarity of first heat dissipation boles each formed at a position corresponding to the accommodation cell; and/or the second dielectric substrate is provided with the pluarity of second heat dissipation holes each formed at a position corresponding to the accommodation cell.

The first dielectric substrate is provided with the pluarity of first heat dissipation holes, and a first protective layer is between the first dielectric substrate and the first electrode layer, and/or the second dielectric substrate is provided with the pluarity of second heat dissipation holes, and a second protective layer is between the second dielectric substrate and the second electrode layer.

A first protective layer is between the first dielectric substrate and the first electrode layer, and the first protective layer includes a first inorganic layer, a first organic layer, and a second inorganic layer sequentially arranged along a direction away from the first dielectric substrate; and/or a second protective layer is between the second dielectric substrate and the second electrode laver, and the second protective layer includes a third inorganic layer, a second organic layer and a fourth inorganic layer sequentially arranged along a direction away from the second dielectric substrate.

Each of the plurality of phase shift units further includes a first alignment layer between the first electrode layer and the adjustable dielectric layer, and a second alignment layer between the second electrode layer and the adjustable dielectric layer.

Each of the plurality of phase shift units further includes a first bias voltage line electrically connected to the first electrode layer, and a second bias voltage line electrically connected to the second electrode layer.

In a second aspect, an embodiment of the present disclosure provides a method of manufacturing a phase shifter, including; providing a first dielectric substrate and a second dielectric substrate, and forming a plurality of phase shift units between the first dielectric substrate and the second dielectric substrate; where the step of forming any one of the plurality of phase shift units includes:

forming a first electrode layer on the first dielectric substrate, forming a second electrode layer on the second dielectric substrate, aligning and assembling the first dielectric substrate with the first electrode layer formed thereon and the second dielectric substrate with the second electrode layer formed thereon to form a cell, and forming an adjustable dielectric layer between the first electrode layer and the second electrode layer, where orthographic projections of the first electrode layer and the second electrode layer on the first dielectric substrate at least partially overlap each other, and at least one accommodation cell of the phase shift unit is defined in a region where the orthographic projections of the first electrode layer and the second electrode layer on the first dielectric substrate overlap each other; the adjustable dielectric layer is in at least the accommodation cell; and cell gaps of the accommodation cells of at least a part of the plurality of phase shift units are different from each other.

The method of manufacturing a phase shifter further includes:

forming a plurality of spacers on one of the first dielectric substrate and the second dielectric substrate, where each of the plurality of spacers is between the first dielectric substrate and the second dielectric substrate, an orthographic projection of the spacer on the first dielectric substrate does not overlap an orthographic projection of the second electrode layer on the first dielectric substrate, and orthographic projections of at least a part of the plurality of spacers on the first dielectric substrate each overlap an orthographic projection of the first electrode layer on the first dielectric substrate.

The method of manufacturing a phase shifter further includes;

forming a spacer on one of the first dielectric substrate and the second dielectric substrate; where the spacer is between any two adjacent ones of the plurality of phase shift units.

For each of the phase shift units, the at least one accommodation cell includes a plurality of accommodation cells, and the step of forming the phase shift unit further includes:

forming a first filling structure between any two adjacent ones of the plurality of accommodation cells and filled between the first dielectric substrate and the second dielectric substrate.

The method of manufacturing a phase shifter further includes:

forming a second filling structure between the first dielectric substrate and the second dielectric substrate and filled between any two adjacent ones of the plurality of phase shift units.

The method of manufacturing a phase shifter further includes: forming, in the first dielectric substrate, a first heat dissipation hole penetrating through first dielectric substrate along a thickness direction of the first dielectric substrate; and/or forming, in the second dielectric substrate, a second heat dissipation hole penetrating through the second dielectric substrate along a thickness direction of the second dielectric substrate.

In a third aspect, an embodiment of the present disclosure provides an electronic device, which includes any one of the phase shifters described above.

DETAIL DESCRIPTION OF EMBODIMENTS

In order enable one of ordinary skill in the art to better understand the technical solutions of the present disclosure, the present disclosure is further described in detail with reference to the accompanying drawings and the detailed description below.

Unless defined otherwise, technical or scientific terms used herein shall have the ordinary meaning as understood by one of ordinary skill in the art to which the present disclosure belongs. The words "first", "second", and the like used in the present disclosure do not denote any order, quantity, or importance. but rather distinguish one element from another. Likewise, the word "a", "an", or "the" or the like does not denote a limitation of quantity, but rather denotes the presence of at least one. The word "comprising" or "comprises", or the like, means that an element or item preceding the word includes the element or item listed after the word and its equivalent, but does not exclude other elements or items. The word "connected" or "coupled" or the like is not restricted to physical or mechanical connections, but may include electrical connections, whether direct or indirect. "Upper", "lower", "left", "right", and the like are used only to indicate relative positional relationships, and when an absolute position of an object being described is changed, the relative positional relationships may also be changed accordingly.

Figure 1:
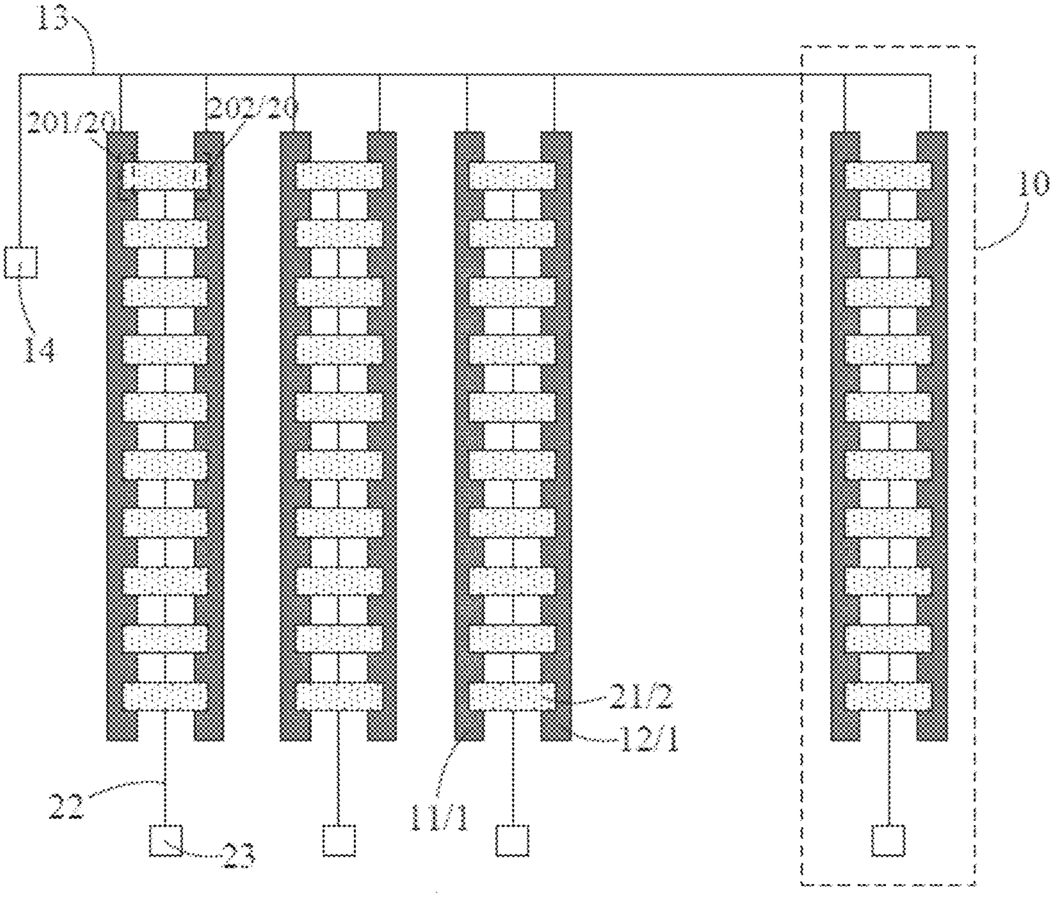
FIG. 1 is a top view of a phase shifter according to an embodiment of the present disclosure.
Figure 2:
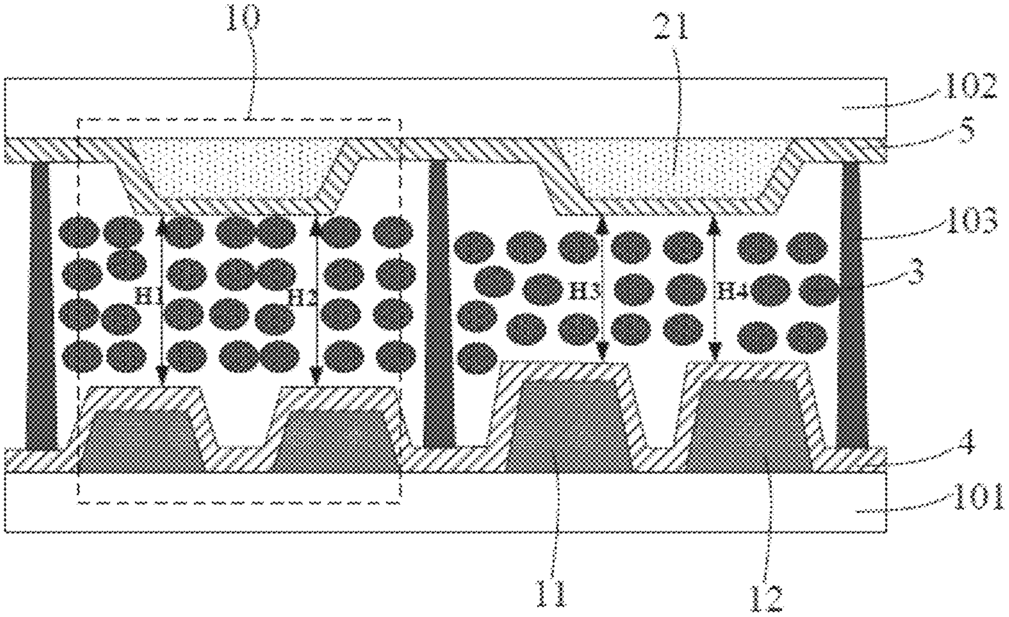
FIG. 2 is a cross-sectional view of a phase shifter according to an embodiment of the present disclosure.

FIG. 1 is a top view of a phase shifter according to an embodiment of the present disclosure; and FIG. 2 is a cross-sectional view of a phase shifter according to an embodiment of the present disclosure. In a first aspect, as shown in FIGS. 1 and 2, an embodiment of the present disclosure provides a phase shifter including a first dielectric substrate 101 and a second dielectric substrate 102 opposite to each other, and a phase shift unit 10 arranged between the first dielectric substrate 101 and the second dielectric substrate 102. The phase shift unit 10 includes a first electrode layer 1, a second electrode layer 2, and an adjustable dielectric layer between the first electrode layer 1 and the second electrode layer 2. The first electrode layer 1 is located on a side of the first dielectric substrate 101 close to the second dielectric substrate 102, and the second electrode layer 2 is located on a side of the second dielectric substrate 102 close to the first dielectric substrate 101. In an embodiment of the present disclosure, for any phase shift unit 10, orthographic projections of the first electrode layer 1 and the second electrode layer 2 on the first dielectric substrate 101 at least partially overlap each other, so that at least one accommodation cell is defined. The adjustable dielectric layer is at least located in the accommodation cell; and cell gaps of the accommodation cells of at least a part of the phase shift units 10 are different from each other.

It should be noted that, in an embodiment of the present disclosure, the liquid crystal layer 3 is taken as an example of the adjustable dielectric layer, but it should be understood that the adjustable dielectric layer includes, but is not limited to, the liquid crystal layer 3. The accommodation cell, i.e., the liquid crystal cell 20, is used for accommodating liquid crystal molecules of the liquid crystal layer 3, where a cell gap of the liquid crystal cell 20 is a thickness of the liquid crystal layer 3 in the liquid crystal cell 20. Furthermore, if the liquid crystal layer is present at positions in the phase shift unit other than the position in the liquid crystal cell, thicknesses of the liquid crystal layer at these positions may be the same as or different from each other. In the embodiment of the present disclosure, if each phase shift unit 10 includes only a plurality of liquid crystal cells 20, for example, two liquid crystal cells 20, namely, a first liquid crystal cell 201 and a second liquid crystal cell 202, the sentence "cell gaps of the liquid crystal cells 20 of at least a part of the phase shift units 10 are different from each other" means that the cell gap of the first liquid crystal cell 201 in one phase shift unit 10 is different from the cell gap of the first liquid crystal cell 201 in other one phase shift unit 10, and/or the cell gap of the second liquid crystal cell 202 in one phase shift unit 10 is different from the cell gap of the second liquid crystal cell 202 in other one phase shift unit 10.

In an embodiment of the present disclosure, through adjusting the cell gap of the liquid crystal cell 20 of the phase shift unit 10, the cell gaps of the liquid crystal cells 20 of at least a part of phase shift units 10 are different from each other, so that the purpose of controlling and adjusting the phase of the electromagnetic wave signal is achieved, the effect of a phased array antenna is further achieved, and continuous adjustment of the beam is achieved.

In some examples, the liquid crystal cells 20 of the respective phase shift units 10 have different cell gaps. For example, thicknesses of the first electrode layers 1 in the respective phase shift units 10 are different from each other, and thicknesses of the second electrode layers 2 in the respective phase shift units 10 are the same as each other.

For another example, the thicknesses of the first electrode layers 1 in the respective phase shift units 10 are the same as each other, and the thicknesses of the second electrode layers 2 in the respective phase shift units 10 are different from each other.

In one example, the first electrode layer 1 includes a first signal electrode 11 and a second signal electrode 12 arranged side by side on the first dielectric substrate 101.

For example, the first signal electrode 11 and the second signal electrode 12 each extend in a first direction, and are arranged side by side in a second direction. The second electrode layer 2 includes a plurality of patch electrodes 21 arranged side by side along the first direction, and orthographic projections of two ends of any one of the patch electrodes 21 on the first dielectric substrate 101 at least partially overlap orthographic projections of the first signal electrode 11 and the second signal electrode 12 on the first dielectric substrate 1011, respectively. That is, a plurality of liquid crystal cells 20 in the phase shift unit 10 are defined, where a liquid crystal cell 20 defined at a position, where the orthographic projection of each patch electrode 21 on the first dielectric substrate 101 overlaps the orthographic projection of the first signal electrode 11 on the first dielectric substrate 101, is a first liquid crystal cell 201; and a liquid crystal cell 20 defined at a position, where the orthographic projection of each patch electrode 21 on the first dielectric substrate 101 overlaps the orthographic projection of the second signal electrode 12 on the first dielectric substrate 101, is a second liquid crystal cell 202.

In the phase shifter including the phase shift units 10 having the above-described structure, thicknesses of the first signal electrode, the second signal electrode 12, and the patch electrode 21 in each phase shift unit 10 may be set as follows. The following description is made with reference to specific examples.

A first example is as follows. With continued reference to FIG. 2, for any phase shift unit 10, the thicknesses of the first signal electrode 11 and the second signal electrode 12 are the same as each other. The thicknesses of the patch electrodes 21 in each phase shift unit 10 are the same as each other. The thicknesses of the first signal electrodes 11 of at least a part of the phase shift units 10 are different from each other (of course, the thicknesses of the second signal electrodes 12 thereof are also different from each other), and in the embodiment of the present disclosure, it is taken as an example that the thicknesses of the first signal electrodes 11 in respective phase shift units 10 are different from each other. In this example, the first liquid crystal cell 201 and the second liquid crystal cell 202 in each phase shift unit 10 have the same cell gap, but the first liquid crystal cells 201/the second liquid crystal cells 202 in different phase shift units 10) have different cell gaps. That is, as shown in FIG. 2, in the phase shift unit on the left 10, the cell gap of the first liquid crystal cell is H1, the cell gap of the second liquid crystal cell is H2, and H1=H2; in the phase shift unit on the right 10, the cell gap of the first liquid crystal cell is H3, the cell gap of the second liquid crystal cell is H4, H3=H4, and H1≠H3.

For such phase shifter, the phase shift amount of a single phase shift unit 10 can be adjusted by changing the cell gap of the phase shift unit 10, and the number and length of the first liquid crystal cell 201/the second liquid crystal cell 202 are not required to be increased, so that the loss of electromagnetic wave signals can be effectively reduced. Furthermore, the phase of the electromagnetic wave can be controlled by changing the cell gaps of the liquid crystal cells 20 of the adjacent phase shift units 10, so that the effect of different phase change amounts on electromagnetic wave signals between the adjacent phase shift units 10 can be achieved. thereby achieving the purpose of phased array antenna.

In some examples, referring to FIG. 1, the phase shift unit 10 includes not only the above-described structure but also a first bias voltage line electrically connected to the first electrode layer 1, that is, electrically connected to the first signal electrode 11 and the second signal electrode 12, and a second bias voltage line electrically connected to the respective patch electrodes 21. The first bias voltage line may be arranged on a side of the first electrode layer 1 close to the first dielectric substrate 101, and may be connected to a reference ground pad. The second bias voltage line may be arranged on a side of the second electrode layer 2 close to the second dielectric substrate 102, and may be connected to a transmission line pad. Furthermore, for the phase shifter, the first bias voltage line in each phase shift unit 10 may be electrically connected to one reference ground pad, the second bias voltage lines in the respective phase shift units 10 may be electrically connected to the independent transmission live pads, and initial phases of the initial electromagnetic wave signals transmitted by the transmission line pads of the respective phase shift units 10 may be the same as or different from each other. A certain amount of phase adjustment of each electromagnetic wave signal is realized by the first liquid crystal cell 201 and the second liquid crystal cell 202 of the phase shift unit 10

Figure 3:
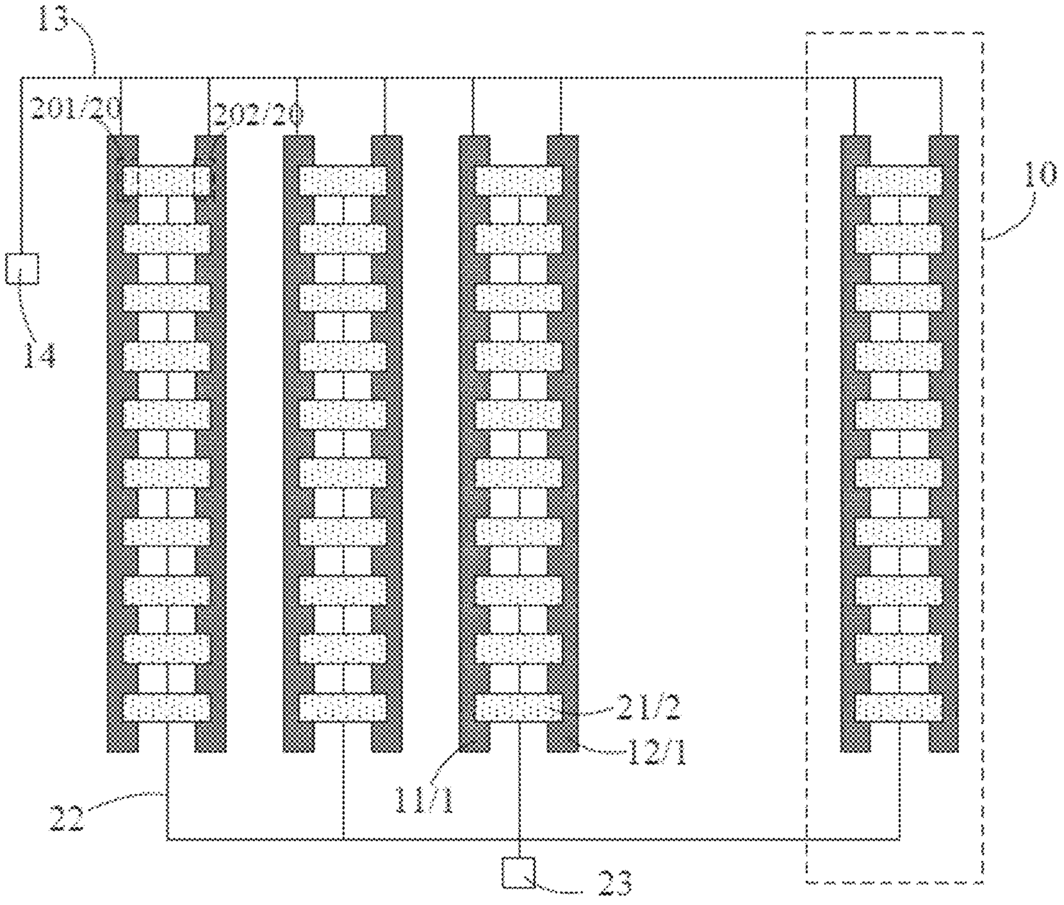
FIG. 3 is a top view of another phase shifter according to an embodiment of the present disclosure.

Alternatively, referring to FIG. 3, the second bias voltage lines in the respective phase shift units 10 may be connected to a same transmission line pad. That is, the initial phases of the electromagnetic wave signals of the respective phase shift units 10 are the same as each other, and the amount of change in the phase of the electromagnetic wave signal caused by each phase shift unit 10 is related to a design of the cell gaps of the first liquid crystal cell 201 and the second liquid crystal cell 202 of the phase shift unit 10.

In some examples, with continued reference to FIG. 2, the phase shift unit 10 includes not only the above-described structure. but also a first alignment layer 4 on a side of the first electrode layer 1 (i.e., the first signal electrode 11 and the second signal electrode 12) close to the liquid crystal layer 3, and a second alignment layer 5 on a side of the second electrode layer 2 (i.e., the respective patch electrodes 21) close to the liquid crystal layer 3. The first alignment layer 4 and the second alignment layer 5 are configured to provide an initial alignment of the liquid crystal layer 3.

Furthermore, the first alignment layer 4 in the respective phase shift units 10 is of a one-piece structure, and the second alignment layer 5 in the respective phase shift units 10 is of a one-piece structure, so that the first alignment layer 4 and the second alignment layer 5 can be conveniently formed, the process efficiency can be effectively improved, and the process cost can be reduced.

In some examples, the phase shifter in an embodiment of the present disclosure includes not only the above-described structure. but also spacers 103 located between the first dielectric substrate 101 and the second dielectric substrate 102 to provide support for the respective liquid crystal cells 20, and the spacers 103 are specifically located between the adjacent phase shift units 10. Furthermore, one end of the spacer 103 may abut against the first alignment layer 4, and the other end of the spacer 103 may abut against the second alignment layer 5.

Figure 4:
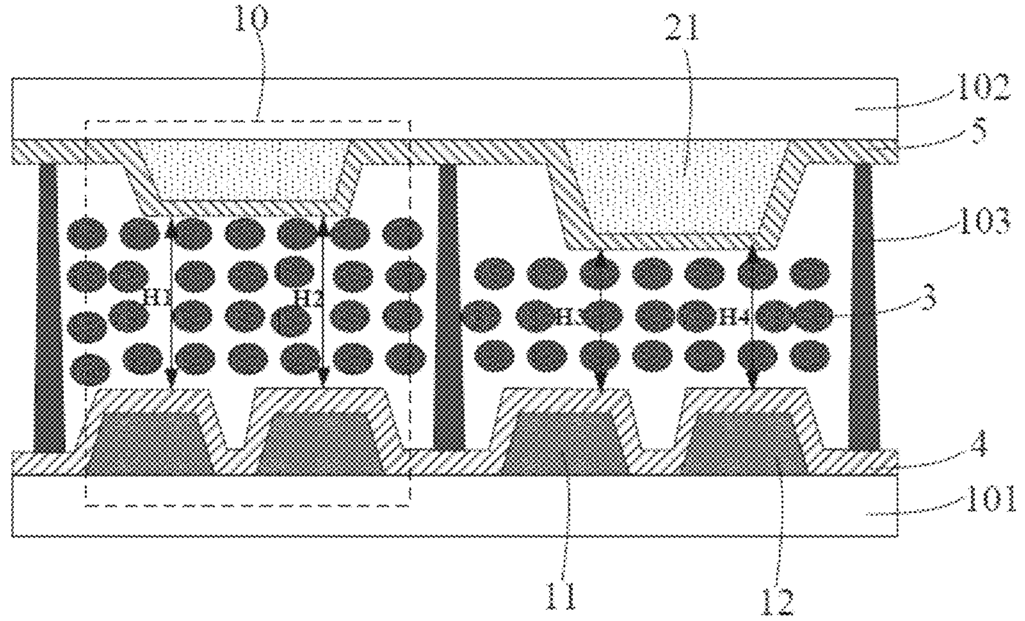
FIG. 4 is a cross-sectional view of a phase shifter in a second example of an embodiment of the present disclosure.

A second example is as follows. FIG. 4 is a cross-sectional view of a phase shifter in a second example of an embodiment of the present disclosure. Referring to FIG. 4, a structure in this example is substantially the same as that in the first example, except that the thicknesses of the first electrode layers 1 in the respective phase shift units 10 are the same as each other, and the thicknesses of the second electrode layers 2 in the respective phase shift units 10 are different from each other. That is, the thicknesses of the first signal electrodes 11/the second signal electrodes 12 in the respective phase shift units 10 are the same as each other, and the thicknesses of the patch electrodes 21 in the respective phase shift units 10 are different from each other. That is, as shown in FIG. 4, in the phase shift unit on the left 10, the cell gap of the first liquid crystal cell is H1, the cell gap of the second liquid crystal cell is H2, and H1=H2; in the phase shift unit on the right 10, the cell gap of the first liquid crystal cell is H3, the cell gap of the second liquid crystal cell is H4, H3=H4, and H1≠H3.

The remaining structures are the same as those in the first example, and therefore, the description thereof is not repeated herein.

Figure 5:
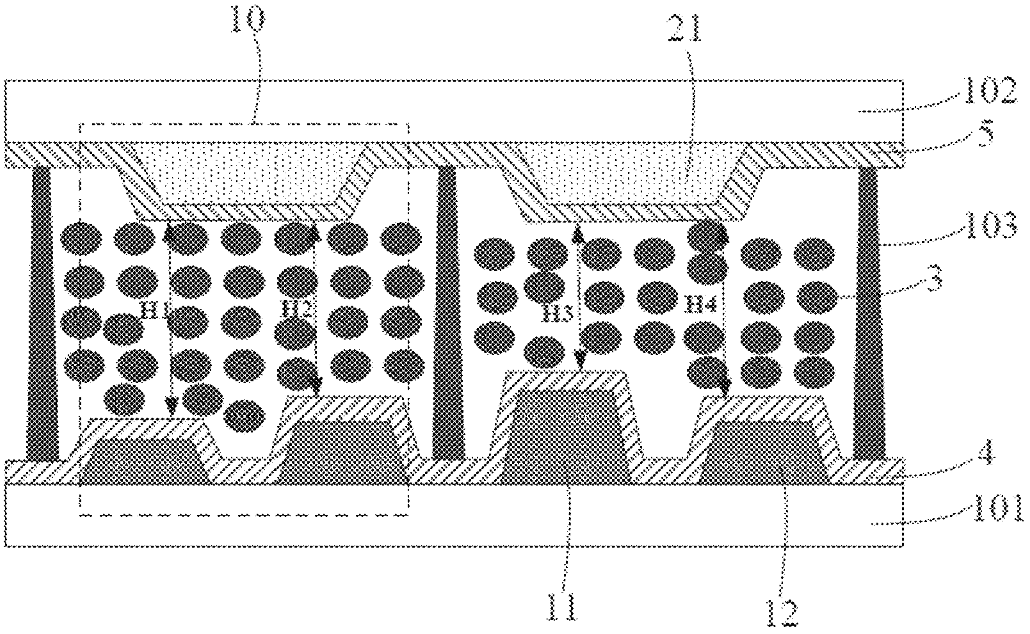
FIG. 5 is a cross-sectional view of a phase shifter in a third example of an embodiment of the present disclosure.

A third example is as follows. FIG. 5 is a cross-sectional view of a phase shifter in a third example of the embodiment of the present disclosure. Referring to FIG. 5, the structure in this example is substantially the same as that in the first example, except that the cell gaps of the first liquid crystal cells 201 of the respective phase shift units 10 are different from each other, and the cell gaps of the second liquid crystal cells 202 of the respective phase shift units 10 are the same as each other. Specifically, the thicknesses of the first signal electrodes 11 in the respective phase shift units 10 are different from each other, the thicknesses of the second signal electrodes 12 are the same as each other, and the thicknesses of the patch electrodes 21 in the respective phase shift units 10 are the same as each other. For example, referring to FIG. 5, in the phase shift unit on the left 10, the cell gap of the first liquid crystal cell is H1, the cell gap of the second liquid crystal cell is H2, and H1>H2, in the phase shift unit on the right 10, the cell gap of the first liquid crystal cell is H3, the cell gap of the second liquid crystal cell is H4, H3<H4, and H1≠H2≠H3≠H4.

The remaining structures are the same as those in the first example, and therefore, the description thereof is not repeated herein.

Figure 6:
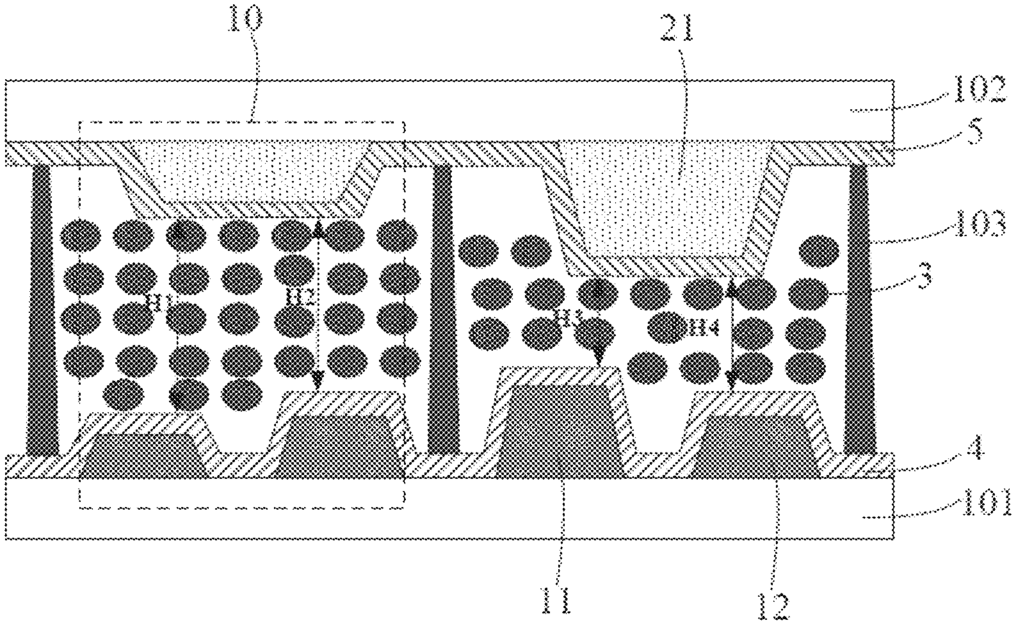
FIG. 6 is a cross-sectional view of a phase shifter in a fourth example of an embodiment of the present disclosure.

A fourth example is as follows. FIG. 6 is a cross-sectional view of a phase shifter in a fourth example of an embodiment of the present disclosure. Referring to FIG. 6, the structure in this example is substantially the same as that of the first example, except that in this example, not only the first signal electrodes 11 and the second signal electrodes 12 in different phase shift units 10 have different thicknesses, but also the patch electrodes 21 in different phase shift units 10 have different thicknesses. In this case, for the phase shifter, the cell gaps of the first liquid crystal cell 201 of the respective phase shift units 10 are different from each other, and the cell gaps of the second liquid crystal cells 202 of the respective phase shift units 10 are also different from each other. For example, referring to FIG. 6, in the phase shift unit on the left 10, the cell gap of the first liquid crystal cell is H1, the cell gap of the second liquid crystal cell is H2, and H1>H2; in the phase shift unit on the right 10, the cell gap of the first liquid crystal cell is H3, the cell gap of the second liquid crystal cell is H4, H3<H4, that is, H1≠H2; H3≠H4

In this structure, since the cell gaps of the first liquid crystal cells 201 of the respective phase shift units 10 are different from each other, the cell gaps of the second liquid crystal cells 202 of the respective phase shift units 10 are also different from each other, and the proportion of the first electrode layer 1 on the first dielectric substrate 101 is relatively large, in this case, the spacer 103 may be arranged on a side of the first electrode layer 1 close to the liquid crystal layer 3, that is, an orthographic projection of at least a part of the spacers 103 on the first dielectric substrate 101 may overlap the orthographic projection of the first electrode layer 1 on the first dielectric substrate 101.

However, in this case, the orthographic projection of the spacer 103 on the first dielectric substrate 101 does not overlap the orthographic projection of the second electrode layer 2 on the first dielectric substrate 101. Of course, there is still a part of the spacers 103, which have orthographic projections not overlapping each of the orthographic projections of the first electrode layer 1 and the second electrode layer 2 on the first dielectric substrate 101. In this case, the heights of at least a part of the spacers 103 in the phase shifter are different from each other.

The remaining structures of the phase shifter in the fourth example may employ the same structures as those in the first example, and therefore, the description thereof is not repeated herein.

Figure 7:
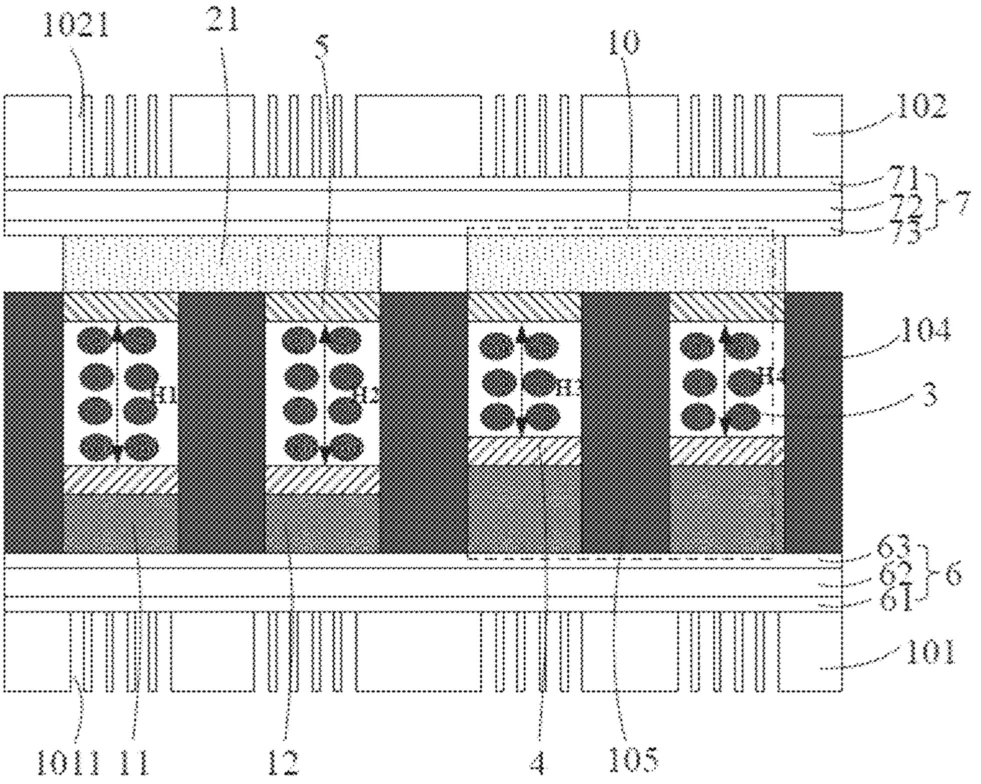
FIG. 7 is a cross-sectional view of a phase shifter in a fifth example of an embodiment of the present disclosure.

A fifth example is as follows. FIG. 7 is a cross-sectional view of a phase shifter in a fifth example of an embodiment of the present disclosure. Referring to FIG. 7, the structure in this example is substantially the same as that of the first example, except that, in this example, for any of the phase shift units 10, a first filling structure 104 is filled between the first liquid crystal cell 201 and the second liquid crystal cell 202. Furthermore, the first filling structure 104 between the first dielectric substrate 101 and the second dielectric substrate 102 may be arranged between the first signal electrode 11 and the second signal electrode 12 With such an arrangement, the flow of the liquid crystal molecules of the liquid crystal layer 3 may be prevented.

In addition, referring to FIG. 7, in the phase shift unit on the left 10, the cell gap of the first liquid crystal cell is H1, the cell gap of the second liquid crystal cell is H2, and H1=H2; in the phase shift unit on the right 10, the cell gap of the first liquid crystal cell is H3, the cell gap of the second liquid crystal cell is H4, H3=H4, and H1≠H3. In some examples, the first filling structure 104 may be made of an organic resin material.

The first filling structure 104 not only can prevent the flow of the liquid crystal molecules of the liquid crystal layer 3, but also can provide support for the first dielectric substrate 101 and the second dielectric substrate 102, thereby maintaining the cell gap of the liquid crystal cell 20.

In some examples, the phase shifter includes not only the first filling structure 104 in the phase shift unit 10, but also a second filling structure 105 filled between the adjacent phase shift units 10 and located between the first dielectric substrate 101 and the second dielectric substrate 102. The second filling structure 105 can also prevent the Dow of liquid crystal molecules of the liquid crystal layer 3, and can provide support for the first dielectric substrate 101 and the second dielectric substrate 102, thereby maintaining the cell gap of the liquid crystal cell 20. The second filling structure 105 may also be made of an organic resin material, so that the first filling structure 104 and the second filling structure 105 may be formed in one process.

In some examples, since the first filling structure 104 is filled between the first signal electrode 11 and the second signal electrode 12 of the phase shift unit 10, and the second filling structure 105 is filled between the adjacent phase shift units 10, in order to enable better heat dissipation during operation of the phase shifter, the first dielectric substrate 101 is provided with a first heat dissipation hole penetrating through the first dielectric substrate 101 along a thickness direction of the first dielectric substrate 101, and the second dielectric substrate 102 is provided with a second heat dissipation hole penetrating through the second dielectric substrate 102 along a thickness direction of the second dielectric substrate 102. The positions of the first heat dissipation hole and the second heat dissipation bole correspond to the positions of the liquid crystal cells 20 (the first liquid crystal cell 201/the second liquid crystal cell 202). A plurality of first heat dissipation holes may be provided, and the first heat dissipation holes at a position corresponding to one first liquid crystal cell 201/second liquid crystal cell 202 may be arranged in an array. Similarly, a plurality of second heat dissipation boles may be provided, and the second heat dissipation holes at a position corresponding to one first liquid crystal cell 201/second liquid crystal cell 202 may be arranged in an array.

Furthermore, the first dielectric substrate 101 and the second dielectric substrate 102 may be thinned to a thickness in a range of 0.2 mm to 0.3 mm from 0.7 mm in the prior art, which is beneficial for the first beat dissipation hole and the second heat dissipation bole to timely discharge heat generated by the phase shifter during the use of the phase shifter, so that a temperature in the liquid crystal cell 20 can be prevented from being too high, the failure of the liquid crystal molecules in the liquid crystal layer 3 due to the high temperature can be prevented, and the performance of the device is prevented from being affected.

Furthermore, the phase shifter in the embodiment of the present disclosure further includes a first protective layer 6 arranged on a side of the first dielectric substrate 101 close to the first electrode layer 1, and a second protective layer 7 arranged on a side of the second dielectric substrate 102 close to the second electrode layer 2 Since the first heat dissipation hole is formed in the first dielectric substrate 101, and the second heat dissipation hole is formed in the second dielectric substrate 102, the first protective layer 6 may be arranged on the first dielectric substrate 101, and the second protective layer 7 may be arranged on the second dielectric substrate 102, so that the influence of moisture and oxygen on the performance of internal devices through the first beat dissipation hole and the second heat dissipation hole can be prevented.

Furthermore, the first protective layer 6 may include a first inorganic layer 61, a first organic layer 62, and a second inorganic layer 63 sequentially arranged in a direction away from the first dielectric substrate 101; and the second protective layer 7 may include a third inorganic layer 71, a second organic layer 72, and a fourth inorganic layer 73 sequentially arranged in a direction away from the second dielectric substrate 102. The first inorganic layer 61, the second inorganic layer 63, the third inorganic layer 71, and the fourth inorganic layer 73 mainly prevent moisture and oxygen from affecting the performance of internal devices through the first heat dissipation hole and the second heat dissipation hole. The first inorganic layer 61, the second inorganic layer 63, the third inorganic layer 71, and the fourth inorganic layer 73 may be made of an inorganic material such as silicon nitride or silicon oxide. The first organic layer 62 and the second organic layer 72 mainly serve to planarize the layers. The first organic layer 62 and the second organic layer 72 may be made of acrylic-based polymer, silicon-based polymer. etc.

The remaining structures in the fifth example may be the same as those in the first example.

Figure 8:
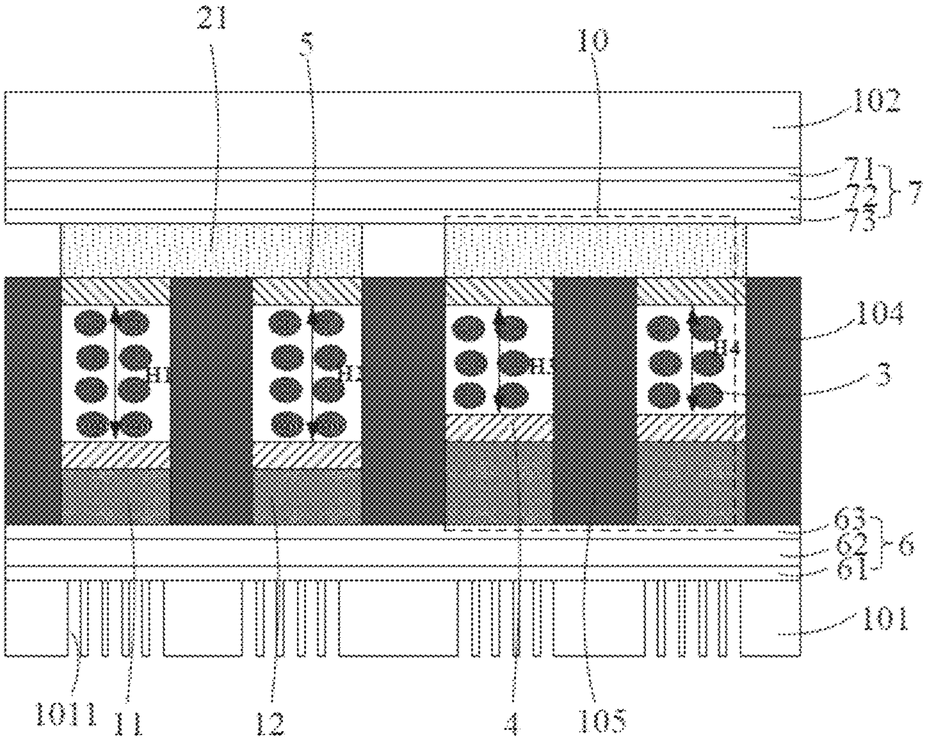
FIG. 8 is a cross-sectional view of a phase shifter in a sixth example of an embodiment of the present disclosure.

A sixth example is as follows. FIG. 8 is a cross-sectional view of a phase shifter in a sixth example of an embodiment of the present disclosure. Referring to FIG. 8, the structure in this example is substantially the same as that of the first example, except that in this example, only the first heat dissipation holes are arranged on the first dielectric substrate 101, and the second dielectric substrate 102 employs a complete flat structure. The remaining structures are the same as those in the fifth example, therefore the description thereof is not repeated herein.

In addition, referring to FIG. 8, in the phase shift unit on the left 10, the cell gap of the first liquid crystal cell is H1, the cell gap of the second liquid crystal cell is H2, and H1=H2; in the phase shift unit on the right 10, the cell gap of the first liquid crystal cell is H3, the cell gap of the second liquid crystal cell is H4, H3=H4, and H1≠H3.

Figure 9:
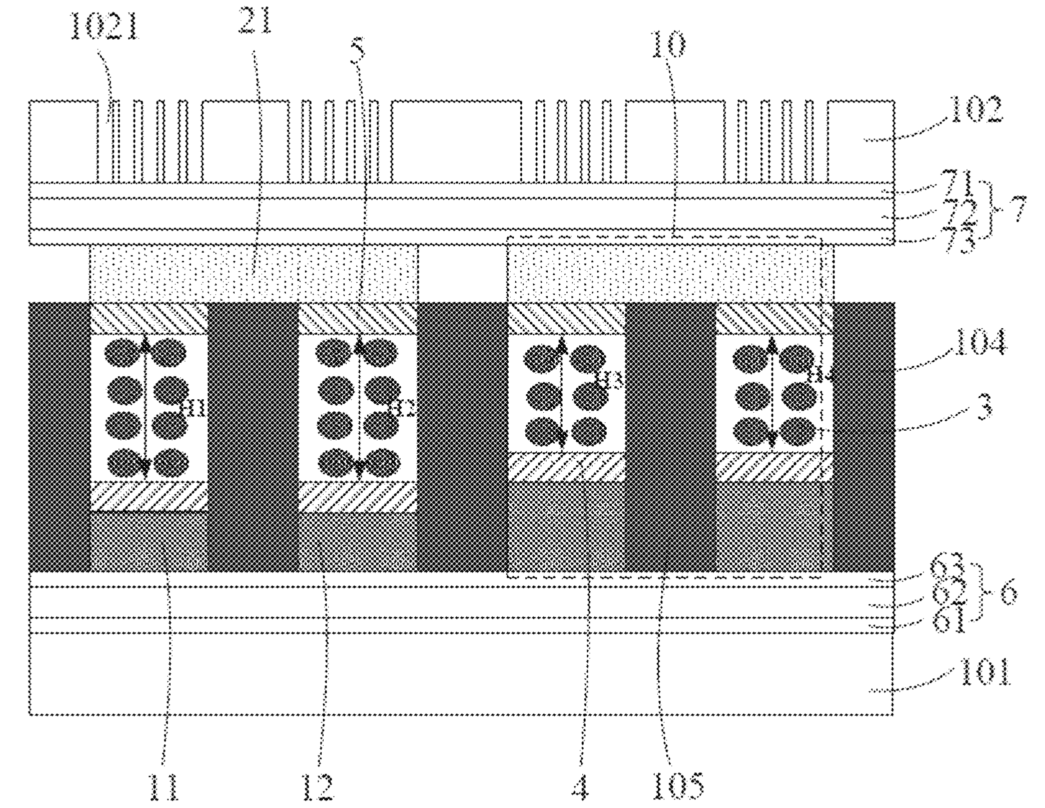
FIG. 9 is a cross-sectional view of a phase shifter in a seventh example of an embodiment of the present disclosure.

A seventh example is as follows. FIG. 9 is a cross-sectional view of a phase shifter in a seventh example of the embodiment of the present disclosure. Referring to FIG. 9, the structure in this example is substantially the same as that of the first example, except that in this example, only the second heat dissipation holes are arranged on the second dielectric substrate 102, and the first dielectric substrate 101 employs a complete flat structure. The remaining structures are the same as those in the fifth example, therefore the description thereof is not repeated herein.

In addition, referring to FIG. 9, in the phase shift unit on the left 10, the cell gap of the first liquid crystal cell is H1, the cell gap of the second liquid crystal cell is H2, and H1=H2; in the phase shift unit on the right 10, the cell gap of the first liquid crystal cell is H3, the cell gap of the second liquid crystal cell is H4, H3=H4, and H1≠H3.

In addition, it should be noted that the first electrode layer 1 and the second electrode layer 2 in the fifth to seventh examples may employ any one of the structures in the second to fourth examples. Alternatively, it is also possible that the thicknesses of the first electrodes of the respective phase shift units 10 in each of the phase shifters in the fifth to seventh examples are the same to each other, and the thicknesses of the second electrode layers 2 of the respective phase shift units 10 in each of the phase shifters in the fifth to seventh examples are the same to each other In some examples, regardless of whether the phase shifter in the embodiment of the present disclosure employs any one of the above architectures, the material of the first electrode layer 1 and the second electrode layer 2 may be a metal material, such as, the metal copper.

In some examples, regardless of whether the phase shifter in the embodiment of the present disclosure employs any one of the above architectures, both of the first dielectric substrate 101 and the second dielectric substrate 102 may employ a glass substrate.

In a second aspect, an embodiment of the present disclosure provides a method of manufacturing a phase shifter, which may be used to manufacture any one of the phase shifters described above. The method of manufacturing the phase shifter may include: providing a first dielectric substrate 101 and a second dielectric substrate 102, and forming a plurality of phase shift units 10 between the first dielectric substrate 101 and the second dielectric substrate 102 The step of forming any phase shift unit 10 includes: forming a first electrode layer 1 on the first dielectric substrate 101, forming a second electrode layer 2 on the second dielectric substrate 102, aligning and assembling the first dielectric substrate 101 with the first electrode layer 1 and the second dielectric substrate 102 with the second electrode layer 2 to form a cell, and forming an adjustable dielectric layer between the first electrode layer 1 and the second electrode layer 2. Orthographic projections of the first electrode layer 1 and the second electrode layer 2 on the first dielectric substrate 101 at least partially overlap each other, and at least one accommodation cell of the phase shift unit 10 is defined at an region where the orthographic projections of the first electrode layer 1 and the second electrode layer 2 on the first dielectric substrate 101 overlap each other, the adjustable dielectric layer is located in at least the accommodation cell; and cell gaps of the accommodation cells of at least a part of the phase shift units 10 are different from each other.

In the phase shifter formed by the manufacturing method according to an embodiment of the present disclosure, through adjusting the cell gap of the liquid crystal cell 20 of the phase shift unit 10, the cell gaps of the liquid crystal cells 20 of at least a part of phase shift units 10 are different from each other, so that the purpose of controlling and adjusting the phase of the electromagnetic wave signal is achieved. the effect of a phased array antenna is further achieved, and continuous adjustment of the beam is achieved.

In order to make the method of manufacturing the phase shifter in the embodiment of the present disclosure clearer, the methods of manufacturing the phase shifters in the first example and the fifth example are described below as examples.

A first example is as follows. Referring to FIG. 2, the method of manufacturing the phase shifter may specifically include providing a first dielectric substrate 101, and sequentially forming a first electrode layer 1, a first alignment layer 4, and a spacer 103 of a respective phase shift unit 10 on the first dielectric substrate 101, providing a second dielectric substrate 102, and sequentially forming a second electrode layer 2 and a second alignment layer 5 of the respective phase shift unit 10 on the second dielectric substrate 102; performing an OC (overcoat) process on the first dielectric substrate 101 and the second dielectric substrate 102 which has been subjected to the above steps; and finally, coating a seal on a periphery of the device, dripping liquid crystal, and performing a cell process, to complete the manufacturing of the entire phase shifter.

Figure 10:
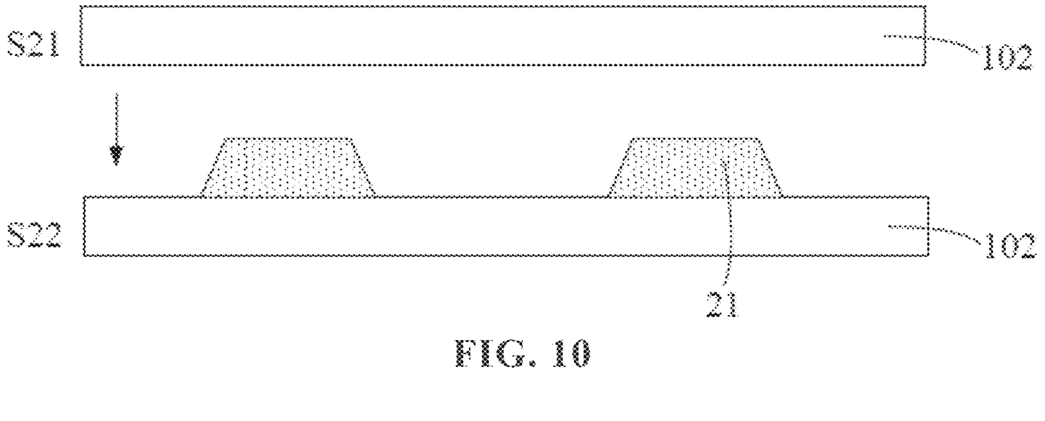
FIG. 10 is a flowchart of steps S11 to S12 in a first example of a method of manufacturing a phase shifter according to an embodiment of the present disclosure.

Referring to FIG. 10, the step of forming the first electrode layer 1 on the first dielectric substrate 101 may specifically include steps S11 and S12. S11, providing the first dielectric substrate 101.

S12, forming the first electrode layer I of the respective phase shift unit 10 on the first dielectric substrate 101.

In some examples, copper is taken as an example of the material of the first electrode layer 1, and step S12 may specifically include: sequentially forming MO/Cu or Ti/Cu metal as a first seed layer through a sputtering process, then depositing copper with a thickness in a range of 2 μm to 5 μm through electroplating, and then forming the first electrode layer 1 through exposure, development and etching. There are two methods of electroplating. The first method is an additive method, in which after the seed layer is deposited, an electroplating PR (photo resistor) retaining wall is formed through a photolithography process, then electroplating is performed, and after the electroplating is finished. strip and copper etching processes are performed to form the patterned first electrode layer 1. The second method is a subtractive method, in which after the seed layer is deposited, electroplating is directly performed to form copper with a certain thickness, and then patterning is realized through photolithography and etching processes. If the additive method is used, a plurality of cycles of photolithography-plating-strip-copper etching processes (the number of the cycles depends on the number of the first electrode layers 1 with different thicknesses) are required to be performed in the process of manufacturing the first electrode layer 1, to form the electrode structure with a gradient in this example.

Figure 11:
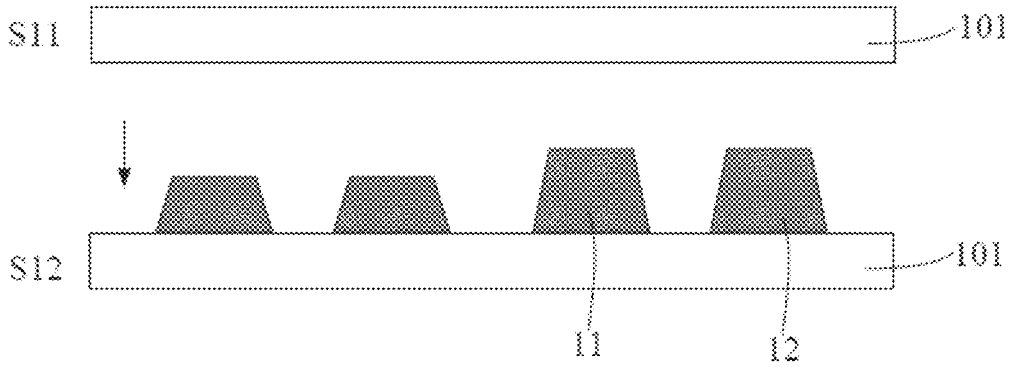
FIG. 11 is a flowchart of steps S21 to S22 in a first example of a method of manufacturing a phase shifter according to an embodiment of the present disclosure.

Referring to FIG. 11, the step of forming the second electrode layer 2 on the second dielectric substrate 102 may specifically include steps S21 and S22. S21, providing the second dielectric substrate 102.

S22, forming the second electrode layer 2 of the respective phase shift unit 10 on the second dielectric substrate 102.

In some examples, copper is taken as an example of the material of the second electrode layer 2, step S22 may specifically include: sequentially forming MO/Cu or Ti/Cu metal as a second seed layer through a sputtering process, then depositing copper with a thickness in a range of 2 μm to 5 μm through electroplating, and then forming the second electrode layer 2 through exposure, development and etching There are two methods of electroplating The first method is an additive method, in which after the seed layer is deposited, an electroplating PR retaining wall is formed through a photolithography process, then electroplating is performed, and after the electroplating is finished, strip and copper etching processes are performed to form the patterned second electrode layer 2. The second method is a subtractive method, in which after the seed layer is deposited, electroplating is directly performed to form copper with a certain thickness, and then patterning is realized through photolithography and etching processes. If the additive process is used, a plurality of cycles of photolithography-plating-strip-copper etching processes (the number of the cycles depends on the number of the second electrode layers 2 with different thicknesses) are required to be performed in the manufacturing of the second electrode layer 2, to form the electrode structure with a gradient in this example.

A second example is as follows. Referring to FIG. 7, the method of manufacturing the phase shifter may specifically include providing a first dielectric substrate 101, and sequentially forming a first protective layer 6, a first electrode layer 1, a first alignment layer 4, a first filling structure 104 and a second filling structure 105, and a liquid crystal layer 3 of a respective phase shift unit 10 on the first dielectric substrate 101; providing a second dielectric substrate 102, and sequentially forming a second protective layer 7, a second electrode layer 2 and a second alignment layer 5 on the second dielectric substrate 102, and then, performing a cell process, to complete the manufacturing of the entire phase shifter.

The first dielectric substrate 101 may have a first heat dissipation bole, the second dielectric substrate 102 may have a second beat dissipation hole, and the first heat dissipation hole and the second heat dissipation hole may be formed through, for example, a sand blasting method, a photosensitive glass method, a focus discharge method, a plasma etching method, a laser ablation method, an electrochemical method, a laser induced etching method, or the like. Different methods have different advantages and disadvantages and application ranges. For example, the sand blasting method has the advantages of simple process, and is only suitable for forming a connecting via with an aperture greater than 200 μm, since the first heat dissipation hole/the second heat dissipation hole formed by the method has larger aperture. The photosensitive glass method bas the advantages of simple process, and is usable to form the first heat dissipation holes/the second beat dissipation holes with high density and high aspect ratio. The advantage of the focused discharge method is high hole forming speed. The first heat dissipation hole/the second beat dissipation hole formed through the plasma etching method has small roughness of side wall. The advantage of the laser ablation method has the advantages of being usable to form connecting vias with high-density and high aspect ratio, but the formed connecting vias has high roughness. The electrochemical method has the advantages of low cost, simple apparatus, and high hole forming speed, and diameter of the first heat dissipation hole/the second heat dissipation bole is larger. The laser-induced etching method has the advantages of high hole forming speed, and is usable to form connecting vias with high-density and high aspect ratio; no damage is caused to the inside of the through hole; while the disadvantage of the laser-induced etching method is that the laser apparatus is expensive. The laser-induced etching method is taken as an example herein, and the hole is formed on a back side of the dielectric substrate through the laser-induced etching method. Firstly, laser induction modification is performed by laser on a position where the connecting via is required to be formed, and then the through hole is formed through a wet etching method.

Figure 12:
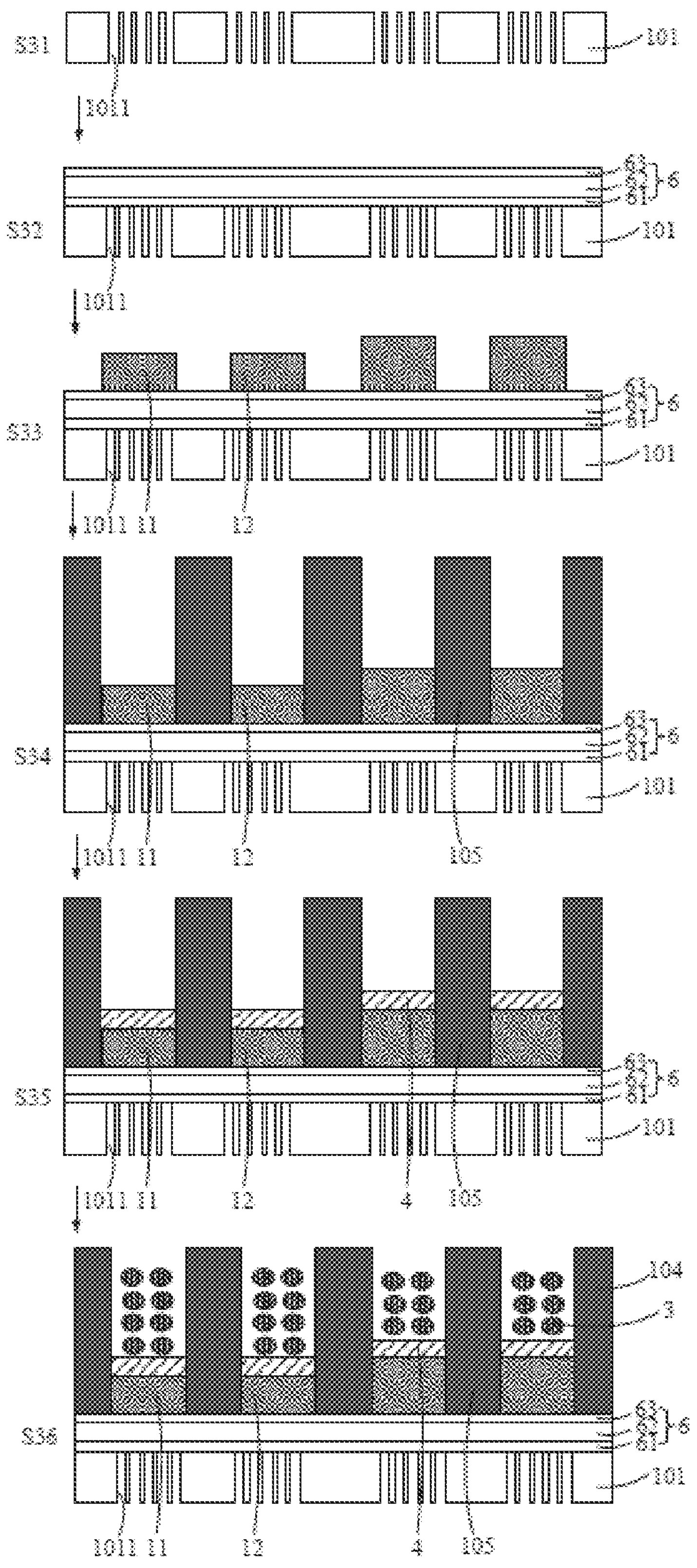
FIG. 12 is a flowchart of steps S31 to S36 in a second example of a method of manufacturing a phase shifter according to an embodiment of the present disclosure.

Referring to FIG. 12. the step of forming the first protective layer 6. the first electrode layer 1, the first and second filling structures 104 and 105, the first alignment layer 4. and the liquid crystal layer 3 on the first dielectric substrate 101 may include steps S31 to S36.

S31, providing the first dielectric substrate 101.

S32, forming the first protective layer 6 on the first dielectric substrate 101.

In some examples, taking the first protective layer 6 including a first inorganic layer 61, a first organic layer 62, and a second inorganic layer 63 sequentially arranged along a direction away from the first dielectric substrate 101 as an example, the step S32 may specifically include: forming the first inorganic layer 61 and the second inorganic layer 63 through a method including, but not limited to, chemical vapor deposition, and forming the first organic layer 62 through a method including, but not limited to, ink jet printing or spray coating.

S33, forming the first electrode layer 1 on a side of the first protection layer 6 away from the first dielectric substrate 101.

The formation of the first electrode layer 1 may be the same as that in step S12. and therefore, the description thereof is not repeated herein.

S34, forming the first filling structure 104 and the second filling structure 105 on the first dielectric substrate 101 with the first electrode layer 1 formed thereon.

In some examples, the first filling structure 104 and the second filling structure 105 may be made of an organic resin material. Step S34 may include: forming an organic resin material layer, and then performing photolithography on the organic resin material layer to form the first filling structure 104 and the second filling structure 105.

S35, forming the first alignment layer 4 on the first electrode layer 1, and rubbing the first alignment layer 4 such that the first alignment layer 4 is aligned, and then curing the first alignment layer 4.

S36, injecting liquid crystal, to form the liquid crystal layer 3 of the respective phase shift unit 10.

Figure 13:
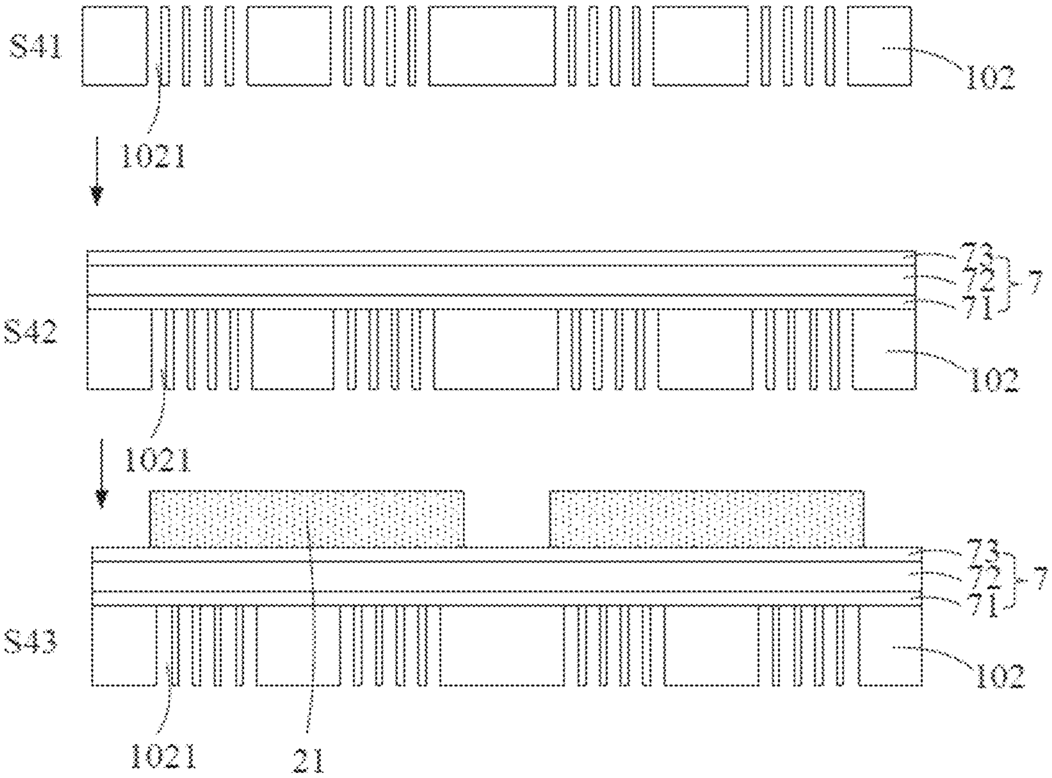
FIG. 13 is a flowchart of steps S41 to S43 in a second example of a method of manufacturing a phase shifter according to an embodiment of the present disclosure.

Referring to FIG. 13, the step of forming the second protective layer 7 and the second electrode layer 2 on the second dielectric substrate 102 may specifically include step S41 to S43.

S41, providing the second dielectric substrate 102.

S42, forming the second protective layer 7 on the second dielectric substrate 102.

In some examples, taking the second protective layer 7 including a third inorganic layer 71, a second organic layer 72, and a fourth inorganic layer 73 sequentially arranged in a direction away from the first dielectric substrate 101 as an example, the step S42 may specifically include: forming the third inorganic layer 71 and the fourth inorganic layer 73 through a method including, but not limited to, chemical vapor deposition, and forming the second organic layer 72 through a method including, but not limited to, ink jet printing or spray coating.

S43, forming the second electrode layer 2 on a side of the second protective layer 7 away from the second dielectric substrate 102.

The formation of the second electrode layer 2 may be the same as that in step S22, and therefore, the description thereof is not repeated herein.

In a third aspect, an embodiment of the present disclosure provides an antenna, which may include the phase shifter described above.

In some examples, the antenna according to an embodiment of the present disclosure further includes a transceiving unit, a radio frequency transceiver, a signal amplifier, a power amplifier, and a filtering unit. The antenna in a communication apparatus may serve as a transmitting antenna or a receiving antenna The transceiving unit may include a baseband and a receiving terminal, where the baseband provides a signal of at least one frequency band, for example, provides a 2G signal, a 3G signal, a 4G signal, a 5G signal, or the like, and transmits the signal of at least one frequency band to the radio frequency transceiver. After a signal is receiving by the antenna in the communication system, the signal may be transmitted to a receiving terminal in the transceiving unit after the signal is processed by the filtering unit, the power amplifier, the signal amplifier, and the radio frequency transceiver, where the receiving terminal may be, for example, an intelligent gateway Furthermore, the radio frequency transceiver is connected to the transceiving unit and is used for modulating the signals transmitted by the transceiving unit or for demodulating the signals received by the antenna and then transmitting the signals to the transceiving unit. Specifically, the radio frequency transceiver may include a transmitting circuit, a receiving circuit, a modulating circuit, and a demodulating circuit. After the transmitting circuit receives various types of signals provided by the baseband, the modulating circuit may modulate the various types of signals provided by the baseband, and then transmit the modulated signals to the antenna. The antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Furthermore, the radio frequency transceiver is connected to the signal amplifier and the power amplifier, the signal amplifier and the power amplifier are further connected to the filtering unit, and the filtering unit is connected to at least one antenna. In the process of transmitting a signal by the communication system, the signal amplifier is used for improving a signal-to-noise ratio of the signal output by the radio frequency transceiver and then transmitting the signal to the filtering unit, the power amplifier is used for amplifying a power of the signal output by the radio frequency transceiver and then transmitting the signal to the filtering unit; the filtering unit specifically includes a duplexer and a filtering circuit, the filtering unit combines signals output by the signal amplifier and the power amplifier into a signal and filters out noise waves and then transmits the signal to the antenna, and the antenna radiates the signal. In the process of receiving a signal by the antenna system, the antenna receives the a signal and then transmits the signal to the filtering unit, the filtering unit filters out noise waves in the signal received by the antenna and then transmits the signal to the signal amplifier and the power amplifier, and the signal amplifier gains the signal received by the antenna to increase the signal-to-noise ratio of the signal; the power amplifier amplifies a power of the signal received by the antenna. The signal received by the antenna is processed by the power amplifier and the signal amplifier and then transmitted to the radio frequency transceiver, and the radio frequency transceiver transmits the signal to the transceiving unit.

In some examples, the signal amplifier may include various types of signal amplifiers, such as a low noise amplifier, which is not limited herein In some examples, the antenna according to an embodiment of the present disclosure further includes a power management unit, connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and essence of the present disclosure, and these changes and modifications are to be considered within the scope of the present disclosure.

What is claimed is:

1. A phase shifter, comprising a first dielectric substrate and a second dielectric substrate opposite to each other, and a plurality of phase shift units between the first dielectric substrate and the second dielectric substrate, wherein each of the plurality of phase shift units comprises a first electrode layer, a second electrode layer and an adjustable dielectric layer between the first electrode layer and the second electrode layer; the first electrode layer is on a side of the first dielectric substrate close to the adjustable dielectric layer, and the second electrode layer is on a side of the second dielectric substrate close to the adjustable dielectric layer; orthographic projections of the first electrode layer and the second electrode layer on the first dielectric substrate at least partially overlap each other, and at least one accommodation cell of the phase shift unit is defined in a region where the orthographic projections of the first electrode layer and the second electrode layer on the first dielectric substrate overlap each other; the adjustable dielectric layer is in at least the accommodation cell; and cell gaps of the accommodation cells of at least a part of the plurality of phase shift units are different from each other, wherein the first electrode layer comprises a first signal electrode and a second signal electrode arranged side by side, the second electrode layer comprises a plurality of patch electrodes arranged side by side along an extending direction of the first signal electrode and spaced apart from each other, and an orthographic projection of each of the first signal electrode and the second signal electrode on the first dielectric substrate overlaps an orthographic projection of each of the plurality of patch electrodes on the first dielectric substrate.

2. The phase shifter according to claim 1, wherein for each of the plurality of phase shift units, thicknesses of the first signal electrode and the second signal electrode are the same as each other; thicknesses of the first signal electrodes in at least a part of the plurality of phase shift units are different from each other; and thicknesses of the patch electrodes in the respective phase shift units are the same as each other.

3. The phase shifter according to claim 1, wherein thicknesses of the patch electrodes in the respective phase shift units are the same as each other; for each of the plurality of phase shift units, thicknesses of the first signal electrode and the second signal electrode are different from each other, thicknesses of the first signal electrodes in the respective phase shift units are different from each other, and/or thickness of the second signal electrode in the respective phase shift units are different from each other.

4. The phase shifter according to claim 1, wherein thicknesses of the first electrode layers in the respective phase shift units are the same as each other, and thicknesses of the second electrode layers in at least a part of the plurality of phase shift units are different from each other.

5. The phase shifter according to claim 1, further comprising a plurality of spacers between the first dielectric substrate and the second dielectric substrate;

wherein each of the plurality of spacers is between any two adjacent ones of the plurality of phase shift units.

6. The phase shifter according to claim 1, further comprising a plurality of spacers between the first dielectric substrate and the second dielectric substrate;

wherein an orthographic projection of each of the plurality of spacers on the first dielectric substrate does not overlap an orthographic projection of the second electrode layer on the first dielectric substrate, and orthographic projections of at least a part of the plurality of spacers on the first dielectric substrate each overlap an orthographic projection of the first electrode layer on the first dielectric substrate.

7. The phase shifter according to claim 1, wherein, for each of the plurality of phase shift units, the at least one accommodation cell comprises a plurality of accommodation cells, and a first filling structure between any two adjacent ones of the plurality of accommodation cells is filled between the first dielectric substrate and the second dielectric substrate.

8. The phase shifter according to claim 7, wherein a material of the first filling structure comprises an organic resin material.

9. The phase shifter according to claim 1, further comprising a second filling structure between the first dielectric substrate and the second dielectric substrate, and filled between any two adjacent ones of the plurality of phase shift units.

10. The phase shifter according to claim 9, wherein a material of the second filling structure comprises an organic resin material.

11. The phase shifter according to claim 1, wherein the first dielectric substrate has a plurality of first heat dissipation holes each penetrating through the first dielectric substrate in a thickness direction of the first dielectric substrate, and/or the second dielectric substrate has a plurality of second heat dissipation holes penetrating through the second dielectric substrate in a thickness direction of the second dielectric substrate.

12. The phase shifter according to claim 11, wherein the first dielectric substrate is provided with the pluarity of first heat dissipation holes each formed at a position corresponding to the accommodation cell; and/or the second dielectric substrate is provided with the pluarity of second heat dissipation holes each formed at a position corresponding to the accommodation cell.

13. The phase shifter according to claim 11, wherein the first dielectric substrate is provided with the pluarity of first heat dissipation holes, and a first protective layer is between the first dielectric substrate and the first electrode layer; and/or the second dielectric substrate is provided with the pluarity of second heat dissipation holes, and a second protective layer is between the second dielectric substrate and the second electrode layer.

14. The phase shifter according to claim 11, wherein a first protective layer is between the first dielectric substrate and the first electrode layer, and the first protective layer comprises a first inorganic layer, a first organic layer, and a second inorganic layer sequentially arranged along a direction away from the first dielectric substrate; and/or a second protective layer is between the second dielectric substrate and the second electrode layer, and the second protective layer comprises a third inorganic layer, a second organic layer and a fourth inorganic layer sequentially arranged along a direction away from the second dielectric substrate.

15. The phase shifter according to claim 1, each of the plurality of phase shift units further comprises a first alignment layer between the first electrode layer and the adjustable dielectric layer, and a second alignment layer between the second electrode layer and the adjustable dielectric layer.

16. The phase shifter according to claim 1, wherein each of the plurality of phase shift units further comprises a first bias voltage line electrically connected to the first electrode layer, and a second bias voltage line electrically connected to the second electrode layer.

17. A method of manufacturing a phase shifter, comprising:

providing a first dielectric substrate and a second dielectric substrate, and forming a plurality of phase shift units between the first dielectric substrate and the second dielectric substrate; wherein the step of forming any one of the plurality of phase shift units comprises:

forming a first electrode layer on the first dielectric substrate, forming a second electrode layer on the second dielectric substrate, aligning and assembling the first dielectric substrate with the first electrode layer formed thereon and the second dielectric substrate with the second electrode layer formed thereon to form a cell, and forming an adjustable dielectric layer between the first electrode layer and the second electrode layer, wherein orthographic projections of the first electrode layer and the second electrode layer on the first dielectric substrate at least partially overlap each other, and at least one accommodation cell of the phase shift unit is defined in a region where the orthographic projections of the first electrode layer and the second electrode layer on the first dielectric substrate overlap each other;

the adjustable dielectric layer is in at least the accommodation cell; and cell gaps of the accommodation cells of at least a part of the plurality of phase shift units are different from each other, wherein the first electrode layer comprises a first signal electrode and a second signal electrode arranged side by side, the second electrode layer comprises a plurality of patch electrodes arranged side by side along an extending direction of the first signal electrode and spaced apart from each other, and an orthographic projection of each of the first signal electrode and the second signal electrode on the first dielectric substrate overlaps an orthographic projection of each of the plurality of patch electrodes on the first dielectric substrate.

18. The method according to claim 17, further comprising:

forming a plurality of spacers on one of the first dielectric substrate and the second dielectric substrate, wherein each of the plurality of spacers is between the first dielectric substrate and the second dielectric substrate; an orthographic projection of the spacer on the first dielectric substrate does not overlap an orthographic projection of the second electrode layer on the first dielectric substrate, and orthographic projections of at least a part of the plurality of spacers on the first dielectric substrate each overlap an orthographic projection of the first electrode layer on the first dielectric substrate.

19. An antenna, comprising the phase shifter according to claim 1, wherein the antenna further comprises a radio frequency transceiver configured to modulate signals transmitted by the antenna or demodulate signals received by the antenna.

* * * * *